(No Model.)

J. HAUPT VON HOECHSTATTEN.
SAFETY BRAKE APPARATUS.

No. 447,710. Patented Mar. 3, 1891.

Witnesses
Ella S. Johnson
P. W. Sommers

Inventor
Joseph Haupt von Hoechstatten
Henry G. ...
atty

UNITED STATES PATENT OFFICE.

JOSEPH HAUPT VON HOECHSTATTEN, OF VIENNA, AUSTRIA-HUNGARY.

SAFETY-BRAKE APPARATUS.

SPECIFICATION forming part of Letters Patent No. 447,710, dated March 3, 1891.

Application filed November 20, 1890. Serial No. 372,065. (No model.)

*To all whom it may concern:*

Be it known that I, JOSEPH HAUPT VON HOECHSTATTEN, a subject of the Emperor of Austria-Hungary, residing at Vienna, in the Province of Lower Austria, in the Empire of Austria-Hungary, have invented certain new and useful Improvements in Safety-Brake Apparatus Applicable to Tramway and other Like Vehicles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention relates to car-brakes, and has for its object to provide, in addition to the ordinary brakes used, an auxiliary brake adapted to stop the car more rapidly or suddenly in case of an obstruction on the track than would be the case with the brakes usually provided, though I do not desire to limit myself to the use of my improved brake devices as means auxiliary to the ordinary brakes, as said brake devices may take the place of the usual brakes.

The invention comprises a brake mechanism in which the brake-shoes are applied to the wheel and track or ground in pairs; in means for operating the brakes by hand; in means controlled by an obstruction on the track for operating the brakes automatically, and in the combination of a guard board or fender to prevent an obstruction from falling on the track between the two wheel-trucks, as will now be fully described, reference being had to the accompanying drawings, in which—

Figure 1:
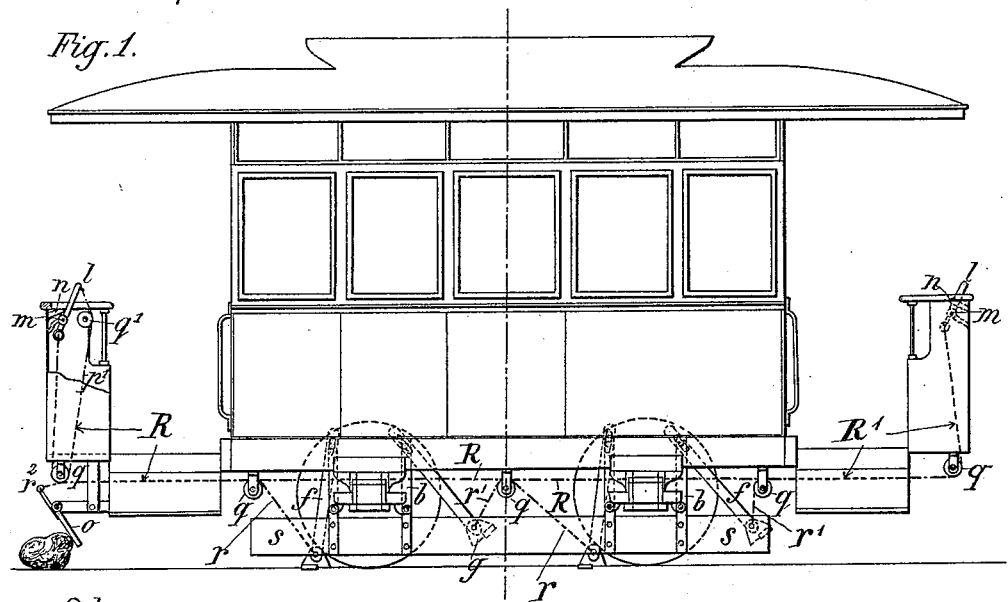
Figure 2:
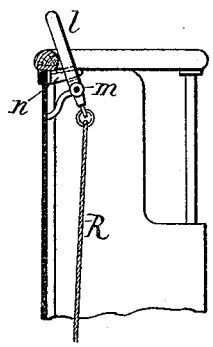
Figure 3:
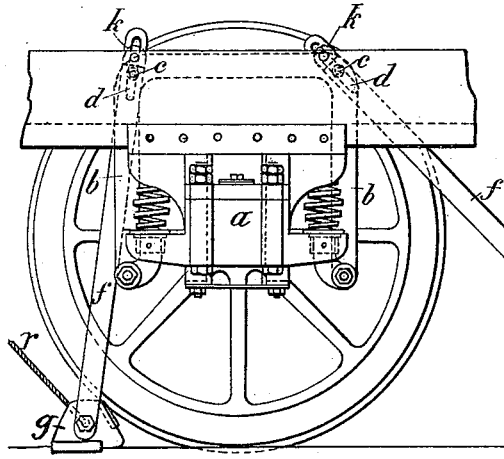
Figure 4:
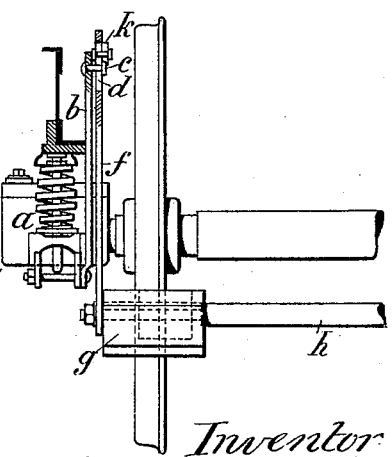

Figure 1 is a side elevation of a car provided with my improved brake, the left-hand platform being partly broken away to show the brake-lever and connections; and Figs. 2, 3, and 4 are detail views drawn to an enlarged scale.

To each axle-box $a$ of a wheel-truck is secured a yoke $b$, provided with pivot-bearings for the pivots $c$, that extend through slots in the upper end of an arm $f$, that is pivoted to the outer end of a cross-bar $h$, so that two arms $f$ on the same side of a pair of wheels are connected together, and on said cross-bars are also secured the brake-shoes $g$ for said pair of wheels. These brake-shoes are of trapezoidal form in cross-section, and are or may be faced with rubber or similar material at the points where they contact with the wheel and rail or ground, and are constructed of any suitable material—as, for instance, a tough wood, such as ash. The object of slotting the arms $f$ at their pivoted end is to provide for adjustment relatively to the track or ground in case of wear, and this adjustment is effected by means of a slide-block $k$, sliding over the slot $d$, and secured in position by an adjusting bolt and nut, as more plainly shown in Fig. 4. The cross-rods $h$ of the two pairs of brake-shoes on the left side of the two pairs of wheels are connected by ropes or chains $r$ to a rope or chain R, and the cross-rods for the other two pairs of brake-shoes are similarly connected to a rope R', said ropes R and R' passing over pulleys $q$ $q'$ to the opposite ends of the car C, where they are attached to a brake-lever $l$. This lever is pivoted to the platform-guard, and is normally held in such a position as to hold the brake-shoes clear of the track and wheels by means of a suitable locking device $n$, that will hold the lever in this position.

Supposing the car, Fig. 1, to be traveling in the direction of the arrow and an obstruction observed on the track, the attendant simply pulls the lever toward him to disengage it from the locking device, thereby lowering the left-hand brake-shoes to the track in contact with the wheels and stopping the car. The same operation takes place when the car travels in an opposite direction by the manipulation of the lever $l$ on the right end of the car, whereby the right-hand brake-shoes will be lowered.

The lever $l$ may be operated by the obstruction itself, in which case said levers should be held by frictional power in their normal position, or the locking device should be so arranged as to release the lever when a power greater than that exerted thereon by the weight of the brake-shoes and their supports and connections is applied to said lever. To this end I provide a cross-fender $o$ at each end of the car, pivotally connected with its support and having an arm $r^2$ connected by a cord or chain $p'$ with the handle portion of the lever, said cord or chain passing around a suitable guide-pulley.

When the lever $l$ is in its normal position, the fender will be in a substantially vertical position and will be tilted rearwardly by the obstruction, thereby pulling on the cord or chain $p'$ and disengaging lever $l$ from its retaining device, as shown in Fig. 1 at the left.

To prevent an obstruction reaching the track between the wheel-trucks while the car is standing still or while in motion I suspend from the axle-boxes a fender $s$, as shown in Fig. 1.

Having described my invention, what I claim is—

1. The combination, with a car, of a brake consisting of an arm pivoted on each side of a car-wheel, connecting-rods connecting two arms on the same side of a pair of wheels, a brake-shoe for each wheel, secured to said connecting-rods, said parts constituting a gravitating brake, chains or ropes extending to the opposite ends of the car, one of which chains or ropes is secured to the connecting-rod on one side of a pair of wheels and the other to the like rod on the opposite side of such wheels, and a lifting and lowering device at each end of the car, connected with said chains or ropes, substantially as and for the purpose set forth.

2. The combination, with a car and its axle-boxes and wheels, of the yokes $b$, connected with said axle-boxes, the arms $f$, pivotally connected with the yokes on opposite sides of a wheel, the connecting-rods $h$, pivotally connecting two arms on the same side of a pair of wheels, a lifting and lowering device at each end of the car, and ropes or chains connecting the rods $h$ on one side of the wheels with the lifting and lowering device on one end of the car and the rods $h$ on the opposite side of the wheels with the like device at the opposite end of the car, substantially as and for the purpose set forth.

3. The combination, in a car-brake, with a vibratory brake-shoe support, of a lifting and lowering device adapted to be operated by an obstruction on the track, and a connection between said device and the brake-shoe support, substantially as set forth.

4. The combination, in a car-brake, with a vibratory brake-shoe support, a lever for vibrating the same, and a connection between said lever and support, of a fender pivotally suspended in front of the wheels, and a connection between the fender and the operating-lever, substantially as and for the purpose set forth.

5. The combination, in a car-brake, with a vibratory brake-shoe arm, a lever for vibrating the same, and a connection between said lever and arm, of a fender pivotally suspended from the car in front of the wheels, a connection between the fender and operating-lever adapted to impart motion thereto, and a fender $s$, suspended outside of the wheels, substantially as and for the purpose set forth.

6. In a car-brake such as described, the combination, with the yoke $b$, provided with pivot-bearings, of the brake-shoe-frame arms $f$, slotted at their upper ends for the reception of the pivot-pins $c$, and an adjustable slide $k$ on the slotted end of said arms, acting as a stop for the pivots $c$, substantially as and for the purpose set forth.

In testimony whereof I affix my signature in presence of two witnesses.

J. HAUPT VON HOECHSTATTEN.

Witnesses:
NETTIE S. HARRIS,
W. B. MURPHY.